United States Patent [19]

Draeger

[11] Patent Number: 4,679,432
[45] Date of Patent: Jul. 14, 1987

[54] PROBE FOR MEASURING THE LEVEL OF A LIQUID

[75] Inventor: Erich Draeger, Asnieres, France
[73] Assignee: Veglia, Paris, France
[21] Appl. No.: 801,860
[22] Filed: Nov. 26, 1985

[30] Foreign Application Priority Data

Nov. 27, 1984 [FR] France .................... 84 18025

[51] Int. Cl.⁴ .................................. G01F 23/24
[52] U.S. Cl. ...................... 73/295; 219/504; 338/24
[58] Field of Search .......... 73/295, 304 R; 338/24, 338/25, 28, 34

[56] References Cited

U.S. PATENT DOCUMENTS

| | | | |
|---|---|---|---|
| 3,434,940 | 3/1969 | Brown et al. | 204/15 |
| 3,479,875 | 11/1969 | Riddel | 73/295 |
| 3,777,177 | 12/1973 | Norkum et al. | 73/304 R |
| 3,845,443 | 10/1974 | Fisher | 338/25 |
| 4,052,901 | 10/1977 | Bjork | 73/313 |
| 4,129,848 | 12/1978 | Frank et al. | 73/295 X |
| 4,183,136 | 1/1980 | Colla | 338/25 X |
| 4,259,982 | 4/1981 | Bartels | 73/304 R |
| 4,299,126 | 11/1981 | Heuwieser et al. | 73/295 |
| 4,567,762 | 2/1986 | Hoppert et al. | 73/304 R |

FOREIGN PATENT DOCUMENTS

| | | |
|---|---|---|
| 0009252 | 4/1980 | European Pat. Off. . |
| 0039510 | 11/1981 | European Pat. Off. . |
| 1665582 | 11/1972 | Fed. Rep. of Germany . |
| 2700229 | 7/1978 | Fed. Rep. of Germany . |
| 3232333 | 3/1984 | Fed. Rep. of Germany . |
| 2325909 | 4/1977 | France . |
| 2367276 | 5/1978 | France . |
| 2094983 | 9/1982 | United Kingdom . |

*Primary Examiner*—Daniel M. Yasich
*Attorney, Agent, or Firm*—Stevens, Davis, Miller & Mosher

[57] ABSTRACT

The present invention provides a probe for measuring the level of a liquid, including a conductor partially immersed in said liquid and whose degree of immersion depends on said variable level to be measured, the resistivity of which conductor depends on the temperature. The conductor is for example etched on an insulating support which is a better conductor of heat than air. The result is a very good linearity for rapid measurements, higher accuracy and a great mounting simplicity.

5 Claims, 3 Drawing Figures

PROBE FOR MEASURING THE LEVEL OF A LIQUID

BACKGROUND OF THE INVENTION

1. Field of the Invention

The present invention relates to a probe for measuring the level of a liquid comprising a conductor of given length made from a material whose resistivity depends on the temperature, provided for mounting on said reservoir so that, over at least a first variable part of its length said conductor is immersed in said liquid and, over the second non-immersed remaining part, said conductor is therefore in a gaseous medium, the variable ratio between said first and second parts being thus linked to the variable level to be measured.

Such a probe is used in particular for measuring the oil level in the crank case of an internal combustion engine for motor vehicles.

2. Description of the Prior Art

A probe of this type is already known in which the conductor is a wire made from a nickel, cobalt and iron alloy, whose resistivity has a high temperature coefficient. With this probe, measurement of the level of the liquid is made by applying a current source to the output terminals of the probe and measuring, after a given time interval, the value of the voltage at the terminals of the probe.

The value of the voltage at the terminals of the probe at this time is representative of the variable level of the liquid for the following reasons:

- the value of the voltage at the terminals of the probe at all times is representative of the value of the resistance of the total length of the conductor, for it has a constant current flowing therethrough,
- the value of this resistance depends on the temperature distribution along the conductor, for the material from which it is formed has a resistivity with a high temperature coefficient,
- the temperature distribution along the conductor may be considered as uniform for the first immersed part and uniform for the second non-immersed part, these two parts, both heated by the passage of the current, being at different temperatures because they are cooled differently by the media in which they are located.

When it is desired to make the measurement rapidly, it is too long to wait until the balance temperature is reached for the immersed part, which is very greatly cooled by the liquid and whose temperature rise is slow. Thus, at the time of measuring the voltage, the temperature at the immersed part develops with a time constant very much greater than the time interval elapsing from the time of application of the current source.

On the other hand, the non-immersed part of the conductor which is in a gaseous medium, is much less cooled and it reaches its balance temperature much more rapidly, with a very short time constant.

This disparity of behavior between the immersed part of the conductor and its non-immersed part results in the non linearity of the variation of the value of the voltage at the measuring time, as a function of the variation of the level of the liquid.

SUMMARY OF THE INVENTION

The present invention aims at overcoming this disadvantage.

For this, it provides a probe for measuring the level of a liquid of the above defined type, characterized by the fact that it further comprises means for promoting the conduction of heat between said non-immersed second part of the conductor and said gaseous medium.

With the invention, cooling of the second non immersed part of the conductor by the gaseous medium is efficient.

The result is that the time constant, so that the voltage at the ends of the non-immersed part of the conductor reaches its final value when the probe is subjected to a current level, is much higher, which allows a linear response of the sensor to be obtained even for very brief measuring times.

In a preferred embodiment, said conductor comprises a conducting ribbon, said gaseous medium is air and said means for promoting the conduction of heat is an insulating support made fom a material which is a better conductor of heat than air, on which said conducting ribbon is applied.

In this case, the support which is a better conductor of heat than air also serves as mechanical support. Thus, it is no longer necessary, as in the known probe, to hold the resistive wire in position by means of a spring, the cause of inaccuracies in the measurement and complications in fitting. This known probe comprises a V-shaped resistive and flexibe wire, with a first end of the V-shape being soldered to a first piece of metal and the second end of the V-shape being soldered to a second piece of metal. A spring is tensioned between the groove of the V and a third piece. These three pieces are mechanically stabe, electrically isolated and hold the resistive wire in position. These pieces also provide an electrical connection with the resistive wire.

Finally, the dispersion of the resistance values of the conducting ribbons thus formed is very low, as opposed to the high dispersion of the resistance values of the wires used in the known probe.

Thus, it is no longer necessary, as in the known probe to use an additional resistance adjusted for each sample, so as to maintain the dispersion within tolerable limits.

Thus, the probe of the invention is also distinguished from the known probe by appreciably simpler and so more economical mounting, a higher accuracy and a lower dispersion of the response.

BRIEF DESCRIPTION OF THE DRAWINGS

The invention will be better understood from the following description of a preferred embodiment of the probe of the invention, made with reference to the accompanying drawings in which.

DESCRIPTION OF THE PREFERRED EMBODIMENTS

Figure 1:
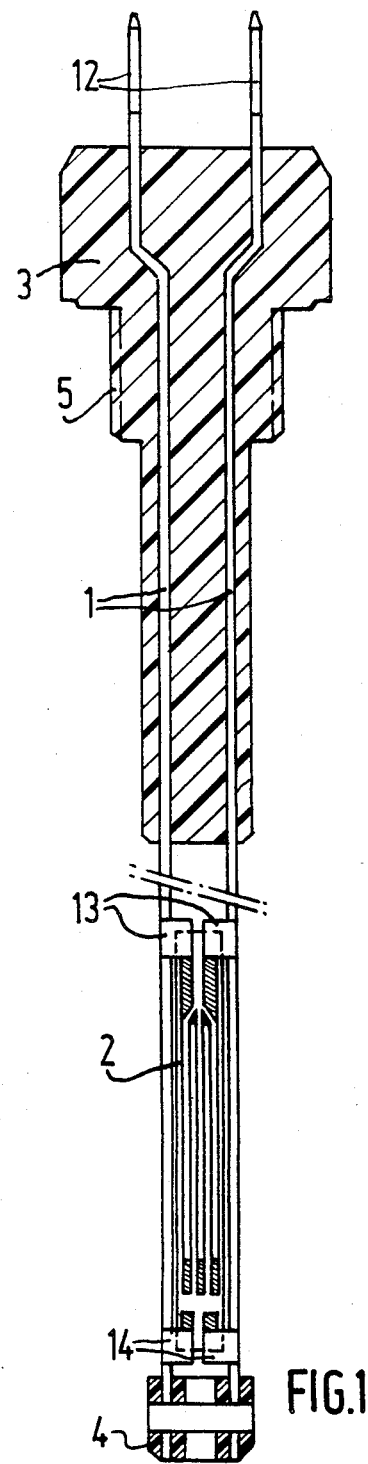
FIG. 1 shows, on the scale of 2, a partial sectional view of the probe of the invention.

Referring to FIG. 1, the output terminals 12 of the level measuring probe of the invention are formed by the two adjacent ends of two metal pieces 1, the other two ends of which are connected to the ends of a conducting ribbon, arranged here so as to form a resistive network 2 which forms the sensitive part of the probe, partially immersed in the liquid whose level it is desired to measure.

The metal pieces 1 are held in position on the output side by a body 3 molded from an insulating material and, beyond the resistvie element 2, by an insulating protective cap 4.

The molded body 3 is provided with a threaded portion 5 for fixing the probe to a tapped opening 101, provided for this purpose in the reservoir 100 containing the liquid 103 whose level it is desired to measure. The metal pieces 1 extend beyond the molded body 3 so that the output terminals 12 of the probe are accessible from outside the reservoir.

Figure 2:
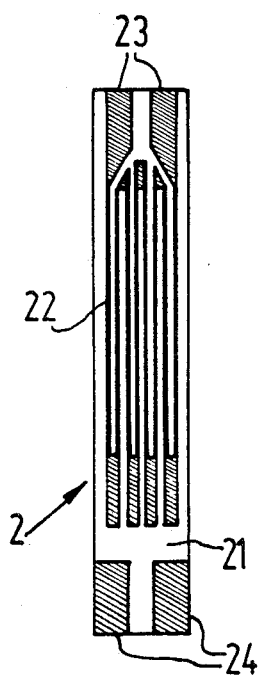
FIG. 2 shows, on a scale of 4, a view of the resistive network used in the probe of FIG. 1
Figure 3:
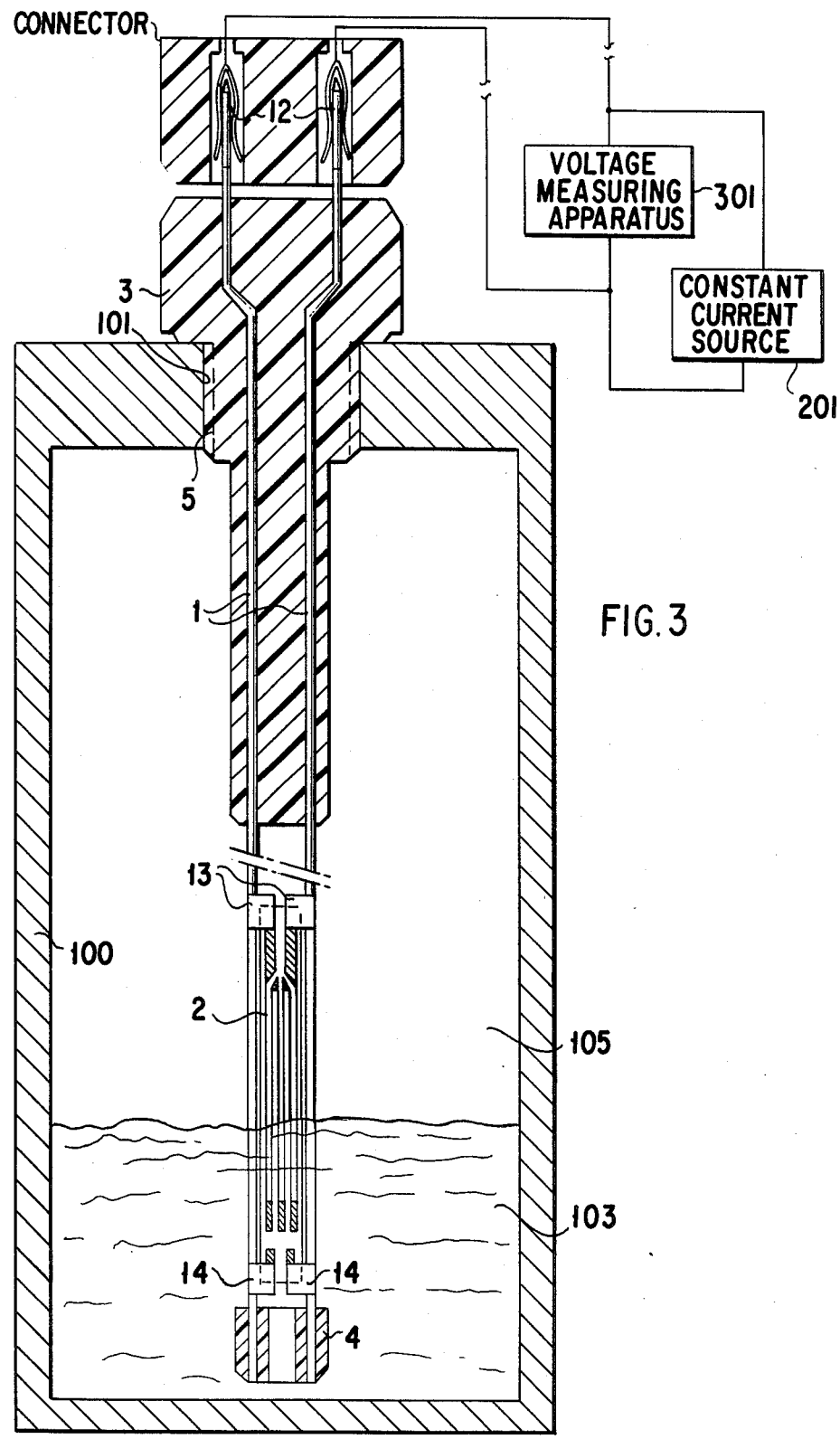
FIG. 3 shows additional details of the probe of the invention.

Referring to FIG. 2, the resistive network 2, applied to an insulating support 21 made from a material which is a better heat conductor than air, is formed by a resistive ribbon 22 of given length, folded in a zig zag pattern including a plurality of U-turns separated by a plurality of rectilinear segments, so that the rectilinear segments which form it are disposed in side-by-side parallel relationship to each other and perpendicular to the surface of the liquid 103, and the two accesses 23 for which are situated on the same side of support 21. The resistive ribbon 22 is made from a material whose resistivity has a high temperature coefficient.

Two blocks 24 of the same material as the ribbon are disposed on the side of support 21 opposite the accesses 23.

Returning now to FIG. 1, the resistive network 22 is fixed to the metal pieces 1 by two bent back tongues 13 and 14 with which the metal pieces 1 are provided, welded respectively to the accesses 23 and to the blocks 24.

The resistive network may be manufactured by the following process: a resistive foil, whose resistivity has a very high temperature coefficient, is applied to an insulating support sheet which is a better conductor of heat than air. By chemical etching a large number of examples of the resistive network may then be formed; the accesses 23 and the blocks 24 are then tinned or not, in accordance with the soldering technology; the foil is finally cut up so as to obtain the individual networks.

The probe of the invention is used like the known probe. The probe is mounted in the reservoir so that, over at least a first, variable, part of its lengh the conducting ribbon 22 is immersed in said liquid.

The second remaining part, non-immersed in said liquid is here in a gaseous medium 105 which may be, e.g., air. The insulating support or body 21 serves as a means for promoting conduction of heat from the second remaining part of ribbon 22 to the air. The variable ratio between the first part and the second part is thus related to the variable level to be measured.

To effect a measurement, a constant current from constant current source 201 is applied to the probe and after a given time interval the value of the voltage at its terminal is measured by voltage measuring apparatus 301. Because of the good cooling of the second non-immersed part of the ribbon 22 by support 21, the temperature of this part develops fairly slowly so that the measurement of the voltage is linearly representative of the value of the level of the liquid, even for very brief measurement times.

By way of example, the molded body 3 of the probe may be made from a fiber glass reinforced thermoplastic material and the metal parts made from brass. Similarly, the support material for the resistive network, a better heat conductor than air may be advantageously formed by Kapton of a thickness of 25 micron, commercialized by the firm Du Pont. The resistive network itself may be advantageously formed from an alloy or from a pure metal with a high temperature coefficient and suitable resistivity and whose thickness is less than 20 micron.

Still by way of example, the dispersion of the resistance values thus formed is + or −2%.

The complete automation of the operations for assembling this type of probe is possible without difficulty.

However, the form of the resistive network and of its support which have just been described is not limitative and may be modified without departing from the field of application of the invention. Thus, and by way of example, the wire of the known probe could be used in thermal contact with a heat sink of the known type.

What is claimed is:

1. A probe for measuring the level of a liquid in a reservoir which is at least partially filled with said liquid, said probe comprising:
    a first insulating support member;
    a conductor of given length made from a material whose resistance depends on its temperature, said conductor being supported on said first insulating support member;
    a second insulating support member spaced apart from said first insulating support member;
    a pair of elongated metal pieces supported on said second insulating support member, said metal pieces having first ends and second ends, said first ends forming output electrodes of said probe, said second ends being electrically connected to said conductor and supporting said conductor, said first ends being adapted to be connected to a constant current source such that said conductor can be heated by said constant current source;
    means for mounting said metal pieces on said reservoir so that said conductor is in said liquid over a first part of its length and in a gaseous medium over a non-immersed second remaining part of its length; and
    measuring means connected to said conductor for measuring a voltage drop at said conductor as an indication of said level of said liquid.

2. The probe as claimed in claim 1, wherein said conductor comprises a conducting ribbon, said gaseous medium is air, and further comprising conduction means for promoting the conduction of heat from said second remaining part of said conductor to said gaseous medium, said conduction means including said first insulating support member on which said conducting ribbon is applied, said first insulating support member being made from a material which is a better conductor of heat than air, said ribbon being in the form of a geometrical pattern comprising a plurality of rectilinear segments, said segments being in side-by-side parallel relationship to each other and perpendicular to a plane containing a surface of said liquid in said reservoir.

3. The probe as claimed in claim 2, wherein said conducting ribbon is obtained by chemical etching of said insulating support on which has been applied a foil of said material whose resistivity depends on the temperature.

4. The probe as claimed in claim 2 or 3, wherein said material whose resistivity depends on its temperature is chosen from pure metals and alloys.

5. The probe as claimed in claim 1, further comprising an insulating body in which said metal pieces are integrally molded, said insulating body including a threaded portion for threaded engagement with a tapped opening provided in said reservoir.

* * * * *